US007012685B1

(12) United States Patent
Wilson

(10) Patent No.: US 7,012,685 B1
(45) Date of Patent: Mar. 14, 2006

(54) CLOGGED FILTER DETECTOR

(76) Inventor: David J. Wilson, 2707 Churchill Dr., Huntsville, AL (US) 35816

( * ) Notice: Subject to any disclaimer, the term of this patent is extended or adjusted under 35 U.S.C. 154(b) by 234 days.

(21) Appl. No.: 10/764,727

(22) Filed: Jan. 26, 2004

Related U.S. Application Data

(63) Continuation-in-part of application No. PCT/US02/24760, filed on Aug. 1, 2002, now abandoned.

(60) Provisional application No. 60/310,377, filed on Aug. 6, 2001.

(51) Int. Cl.
*G01N 21/00* (2006.01)

(52) U.S. Cl. .................................... 356/239.1; 356/432

(58) Field of Classification Search ..................... None
See application file for complete search history.

(56) References Cited

U.S. PATENT DOCUMENTS

| 3,324,633 | A |   | 6/1967  | Revell    | 55/274    |
|-----------|---|---|---------|-----------|-----------|
| 3,985,528 | A |   | 10/1976 | Revell    | 55/352    |
| 4,279,508 | A | * | 7/1981  | Everroad  | 356/237.1 |
| 4,583,859 | A | * | 4/1986  | Hall, II  | 356/438   |
| 5,141,309 | A |   | 8/1992  | Worwag    | 356/72    |
| 5,205,156 | A |   | 4/1993  | Hideo     |           |
| 5,351,035 | A |   | 9/1994  | Chrisco   | 340/607   |
| 5,796,472 | A | * | 8/1998  | Wirthlin  | 356/72    |
| 6,052,058 | A |   | 4/2000  | Knox      |           |
| 6,161,417 | A |   | 12/2000 | Nepsund   | 73/168    |

* cited by examiner

*Primary Examiner*—Michael P. Stafira
(74) *Attorney, Agent, or Firm*—Joe Beumer

(57) ABSTRACT

A clogged filter detection system has an optical transmitter (32) aligned to pass light through an air filter (14) of an HVAC air flow plenum, a receiver (34) including a sensor and positioned to receive the transmitted light (48) directly or from a reflector (42), a processing assembly (35) receiving signals from the sensor and communicating a visual (104) or audible (106) indication when an accumulated level of obscuration exceeds a predetermined level and a component support structure. The support structure uses a "U" or "L" shaped bracket (60,63) attached to peripheral structure of a filter receptacle frame (12) and one or more side plates (24,26) of the bracket are connected to an arm (74,76) on which components are carried. The transmitter (32) and receiver (34) may be located on opposite sides of the filter (14) or on the same side, with a retroreflector (46) on the other side. The processing assembly includes a microprocessor (94) and related devices. Measures are also provided for counteracting the presence of fluffy material near the filter, for sensitivity control of sensors and for an aural signal device activated at a predetermined time after a visual indication.

23 Claims, 5 Drawing Sheets

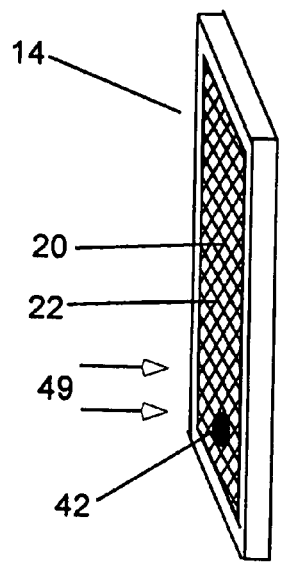
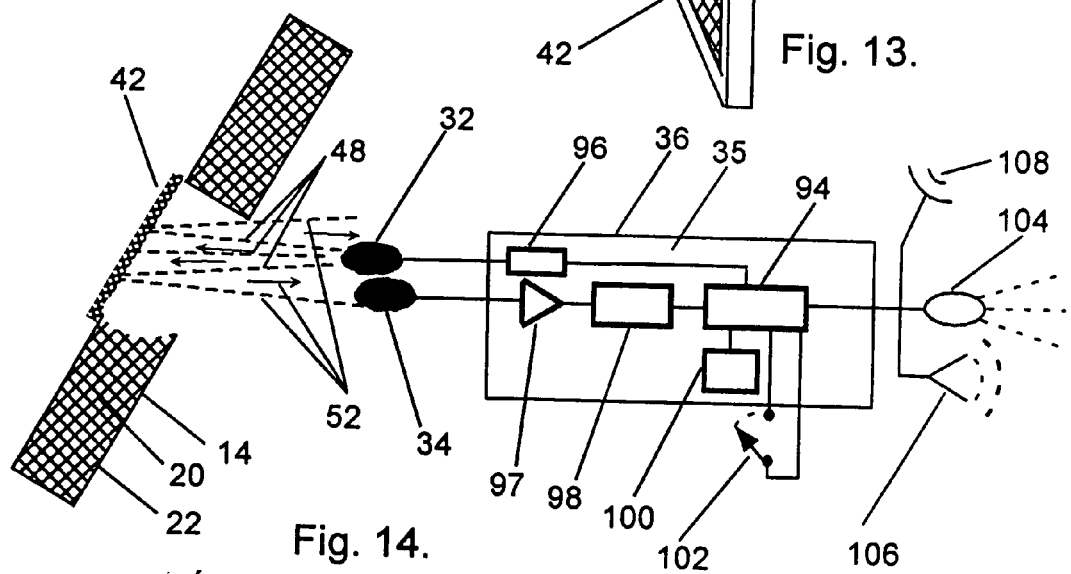
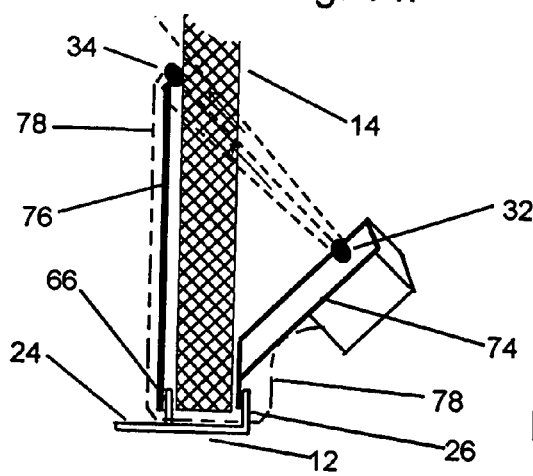

CLOGGED FILTER DETECTOR

CROSS REFERENCE TO RELATED APPLICATIONS

This application is a continuation-in-part of Application PCT/US02/24760, filed 1 Aug. 2002, which in turn claims the benefit of Provisional Application Ser. No. 60/310,377, filed Aug. 6, 2001, now abandoned, by the present applicant.

FIELD OF THE INVENTION

This invention relates to air filters and more particularly to devices for determining when air filters have become clogged.

BACKGROUND OF THE INVENTION

Filters for heating, ventilation and air conditioning systems (HVAC) play an important role by preventing cooling coils and heating surfaces from becoming coated with dust particles, which would result in a loss of efficiency and waste of energy. After a period of operation, dust accumulates on the filters, causing them to become clogged and requiring additional energy consumption. At some point it becomes cost-effective to remove the filter and either clean it or replace it with a new one. HVAC equipment manufacturers typically state their warranties so that the user, not the manufacturer, is responsible for equipment failures due to neglect in maintaining the system, with emphases on the system dust filter. A need exists for a device capable of monitoring the extent of accumulated dust on such filters and for providing a perceptible indication when obscuration of the filter reaches a predetermined level correlated with an optimum replacement time.

Various clogged air filter detection devices based on differential pressure monitoring have been developed in prior art for use in higher air velocity commercial systems, but devices of this type are ineffective for low velocity residential and commercial HVAC systems. Optical devices based on measurement of light passed through or reflected from air filters are also disclosed in certain prior patents. U.S. Pat. No. 5,141,309 discloses an optical system for detecting clogging of a specific type of vacuum cleaner dust filter which employs a pleated fabric filter. This patent shows a forked light unit having one arm carrying a light emitter and the other carrying a receiver so that a pleat of the filter may be placed between the arms in position for the light to be passed through the filter twice. In this device both arms are located on the same side of the filter so that access to the opposite side of the filter is not required. This patent also disclosed a forked light device with one arm disposed on one side of a flat filter and the other arm on the opposite side so that light passes through the filter and another embodiment wherein both the emitter and the receiver are located on the same side of a flat filter and light is directed against the filter surface to obtain a measure of filter loading with dust based on changes in the intensity of the reflected beam. U.S. Pat. No. 3,985,528 discloses an optical system incorporated as a control means for an "automatic roll-type filter" assembly, with a "photocell" indication when to advance clean filter material across the air duct. Placement of arms of a support element on opposite sides of the filter material for passing of light through the material is also disclosed.

The patents discussed above fail to recognize or provide a solution to certain problems presented in developing practical detectors using optical components for HVAC systems. Many of the filters deployed in these systems are located in a position such that very little space is available for mounting of necessary optical components. Filters are commonly placed adjacent to return air grills either touching or almost touching the grills so that no space is available for supporting a transmitter or receiver at any significant distance away from the filter on one side. In addition the nature of such filters imposes requirements for flexibility in placement of the transmitter and receiver. Both faces of the filter may be covered by a thin framework of containment sheets of metal foil provided with large circular openings or a cardboard lattice arrangement allowing air flow but restraining the filter material in place. In order for the transmitter, receiver and reflector to function properly they must be capable of being aligned with one another so as to provide an unobstructed path for passage of a beam of light through the openings.

An additional requirement arises from a need to place the transmitter and receiver at an offset angle with respect to one another so as to avoid partial blocking of flow through the filter at the point being monitored.

Peripheral framework for these filters typically comprises a U-shaped border made of flexible cardboard strips which would not provide enough rigidity to allow component support arms to be supported by this framework in a fixed position, as is required once the components are placed in proper alignment. A more stable base is therefore needed for securing of supports to which monitoring components are attached.

In addition to providing for the effective determination of a level of clogging in filters, detector systems including other features and characteristics would be desirable. In particular, such features would include use of miniaturized electronic components to compensate for the limited availability of space and providing programmable chips for performing such functions as calibrating the system and preparing a schedule for monitoring services.

SUMMARY OF THE INVENTION

The present invention is directed to clogged filter detection systems comprising an optical transmitter adapted to transmit a beam of light through the body of a filter at least once, a receiver including a sensor and positioned to receive the transmitted light directly or from a reflector, a processing assembly for receiving signals from the sensor and communicating a perceptible indication when the level of obscurant reaches a predetermined value and a component supporting structure comprising support elements secured to brackets disposed at the periphery of the filter and engaged with filter receptacle framework. The systems may also include additional components and measures taken to avoid adverse effects of reflection of light by the surface of the filter and to align components of the system in a manner such as to obtain measurements which are not unduly effected by shadowing of portions of the filter at the point being monitored.

The invention may take the form of several embodiments which vary from one another in placement of the transmitter and receiver and in inclusion of other components required for a specific embodiment, in particular, a reflector, polarizing filter and quarterwave retarder.

In a first embodiment an optical transmitter and a receiver are situated on the same side of the filter, and a reflector is placed on the opposite side. Light from the transmitter is directed to the reflector and passes through the filter twice, once on the way to the reflector and a second time after being reflected and directed to the receiver. Upon reaching the receiver and the processing assembly, the reflected light is used to obtain a signal dependent upon an obscurant level in the filter. While other types of reflectors may be used, a retroreflector coupled to a pair of polarizing filters and a polarization rotating element such as a quarter wave plate is preferred to avoid adverse effects of reflection of light from the surface of the filter, especially fore more dense filters.

In a second embodiment the transmitter and receiver are positioned on opposite sides of the filter in alignment with one another so that the light beam passes through the filter only once. The receiver and processing assembly in this case may be carried in a common housing, while the transmitter is carried in a separate housing with a wiring interconnect.

In each of these embodiments, opposing components placed in aligned positions across from one another are preferably offset angularly away from an alignment parallel to air flow in order to avoid shadowing of the area being monitored. Placement of components straight across from one another would result in deposition of a non-representative amount of dust at the area of interest, particularly when one or more of the components is placed in close proximity to the filter.

Component support structure for systems of the invention may comprise a bracket in the form of a thin but rigid base member conforming to a plate of a filter receptacle against which a side face of a border strip of the peripheral framework of the filter is removably positioned, the receptacle also having a restraining ledge integral with and at a right angle to the plate, the ledge securing filter framework from moving in the direction of air flow. The bracket has a first side portion connectible to the ledge with a clip or the like as well as to a first arm and in some cases, a second side portion available for attachment to a second arm. The arms are adapted to support components including transmitters, receivers, processing assemblies and reflectors as appropriate. At least one of the arms may be pivotally and/or flexibly mounted on the ledge with an outer end free to be moved away from the middle portion of the filter in order to allow insertion and removal of the filter from the receptacle and to allow for movements necessary to obtain proper alignment of components.

Owing to flexibility of peripheral framework in which replaceable filters for HVAC systems are contained and their relatively loose fit in filter receptacles, placement of brackets as described above between the filter edge and the filter receptacle plate does not interfere with installation or retention of filters in their required positions.

It is therefore an object of this invention to provide a device for monitoring the extent of obscuration of air filters in HVAC systems.

Another object is to provide a clogged filter detector which includes means for determining and giving a perceptible indication when obscuration of the filter reaches a predetermined level.

A further object is to provide a support structure for components of a clogged filter detection system wherein the support structure is connected to elements of a filter receptacle.

Other objects and advantages of the invention will be apparent from the following detailed description and the appended claims.

BRIEF DESCRIPTION OF THE DRAWINGS

FIG. 13 is a perspective view showing a reflector component attached directly to a mesh extending across a filter.

FIG. 14 is a schematic view showing operation of an electrical network for a transmitter/receiver assembly.

FIG. 15 is an end view of the detector built with and sharing parts with the filter receptacle.

DESCRIPTION OF THE PREFERRED EMBODIMENTS

Figure 1:
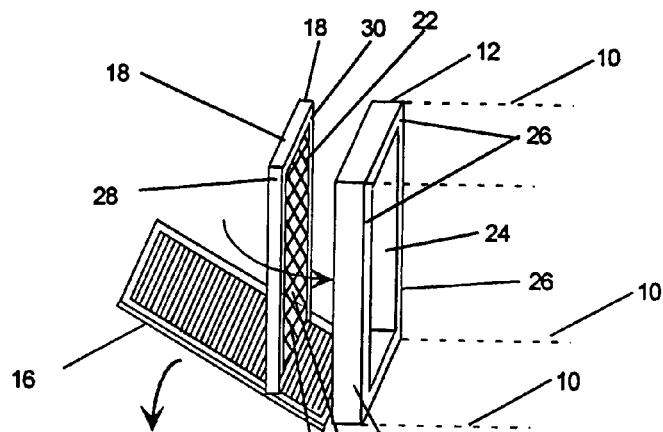
FIG. 1 is an exploded view of an HVAC plenum with a grill, filter and filter receptacle arranged for alignment.

Referring to FIG. 1 of the drawings there is shown a terminal portion of a HVAC plenum 10 (in dotted lines) in which a filter receptacle 12 and a grill 16, connected to the receptacle by means not shown, are aligned for being placed over a filter 14. The filter has an external frame 18 supporting the filter body 20 which is made up of fiber glass or the like and is either self supporting or held in place by mesh 22 on both sides. Receptacle 12 has four side plates 24 with inner surfaces parallel to the direction of airflow and ledges 26 integral with and disposed perpendicular to the plates. Upon insertion of the filter into the receptacle, side edges 28 of the filter fit against inner surfaces of plates 24 and downstream side border faces 30 come into contact with ledges 26, which restrain the filter from moving downstream.

Figure 2:
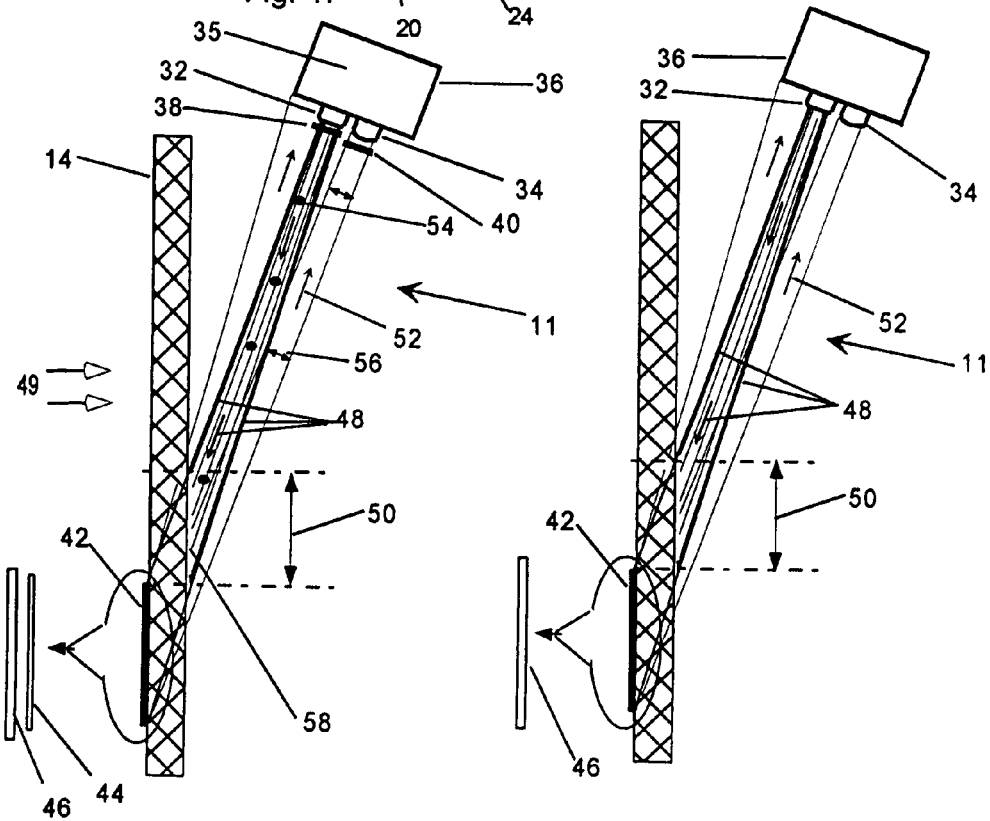
FIG. 2 is a schematic of an optical assembly transmitting light through a filter and receiving light redirected back through the filter by a reflector assembly towards the receiver.

FIG. 2 schematically depicts a clogged air filter detection system 11 positioned to monitor the obscuration level in filter 14 and to provide an indication when the level exceeds a predetermined value, signaling that the time for replacement or cleaning of the filter has come. The system includes a light transmitter 32 such as a Vishay model TLCR 5100 light emitting diode (LED) aimed toward a reflector assembly 42 placed on the side of the filter opposite from the transmitter so that a beam 48 of light passes through the filter and then strikes a retroreflector 46, typically a 3M model 3990 retroreflector. Reflected light is then directed to a receiver 34, such as a Vishay BPV 10 photodiode, which is coupled to a processing assembly 35 wherein a signal responsive to obscuration level of the filter is obtained. The receiver and transmitter may be located in a common housing 36, along with components of the processing assembly.

As shown in FIG. 2, housing 36 is positioned to direct the beam of light through the filter 14 at an acute angle with respect to the plane of the filter. This results in passage of light through an area 50 of the filter which is offset from reflector assembly 42 and is not subjected to shadowing or obstruction of air flow 49 through the portion of the filter being monitored. Placement of the transmitter straight across from the reflector would result in use of a non-representative sample for detection of clogging, especially where optical components are located in close proximity to the filter. Placement of the transmitter and reflector at an angle of 30 to 50 degrees with respect to the filter is preferred.

Randomly polarized radiation is linearly polarized (in this case, perpendicular to the plane of the paper, and represented by the dot 54) via a polarization filter 38, such as a 3M HN38 filter, as it departs the transmitter 32. A linear polarization filter 40, again a 3M HN38, in front of the receiver 34 is oriented to receive polarization normal to that of the transmitted radiation (i.e., polarized in the plane of the paper and represented by the two headed arrow 56) such that any radiation reflected from the filter surface 58 is highly attenuated (~30 dB) before it reaches the receiver 34 photo diode (or phototransistor). The major portion of the radiation which passes through the HVAC filter to the reflector 46 and back is rotated 90 deg via the reflector/quarter-wave-retarder assembly 42. This is accomplished in one of two methods: (a) by the corner cube retroreflector itself (<100% efficient), or (b) by a combination of quarter-wave-retarder 44, such as an Edmun Optics L54-542 retarder, and reflective surface 46. The quarter wave retarder 44 converts the linear polarized radiation 54 to circular polarization which is converted to reverse circular as it is reflected from the reflector 46, (i.e., from right hand circular to left hand circular or visa versa). As it passes back through the retarder 44, the reverse circular radiation is converted back to linear, but with a 90 deg (i.e., flipped) orientation 56 with respect to its original 54 polarization. This radiation is now of the same polarization orientation 56 as the orientation of the polarization filter 40 in front of the receiver 34. Thus its intensity, as modified by the optical density of the dust filter material, is accurately monitored at the receiver 34 and provides an accurate indication of the degree of filter dust contamination. This polarization assembly can be established as depicted, or can be reversed with polarization of transmitted radiation 48 lying in the plane of the paper and the received radiation 52 perpendicular to the plane of the paper.

Figure 3:
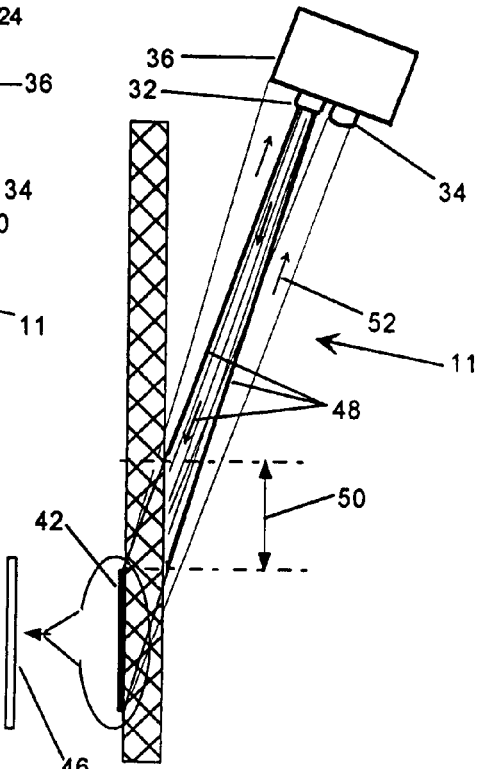
FIG. 3 is a view similar to FIG. 2, but with a simplified reflector assembly.

FIG. 3 shows an embodiment as in FIG. 2 except that no polarization filters are used at the transmitter and receiver, and a retroreflector 46 is placed directly against the filter 14 without an intervening quarter wave retarder or other means for rotation of the polarity of the reflected light. This approach is adequate for less dense (and therefore less costly) filters as are commonly used in residential HVAC systems.

Figure 4:
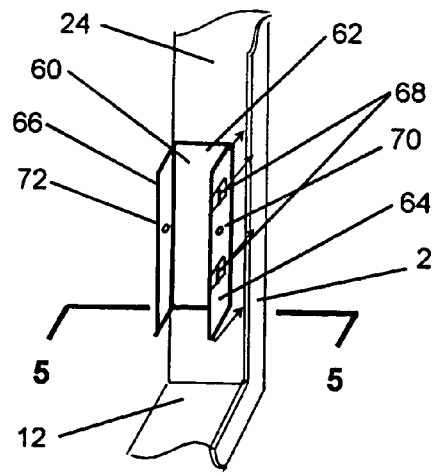
FIG. 4 is an exploded view of an "U" shaped bracket which fits within a filter receptor and supports detector components.

FIG. 4 shows a bracket 60 of U-shaped cross section, having a bottom strip 62 and side strips 64 and 66 to which arms for supporting system components may be connected. Side strip 64 is secured to ledge 26 of the filter receptacle 12 by means of clips 68 which are hooked over the ledge. Side 64 has an aperture 70 placed to receive a bolt or rivet extending through the arm. Side strip 66 also has an aperture 72 to enable connection to a second arm.

Figure 5:
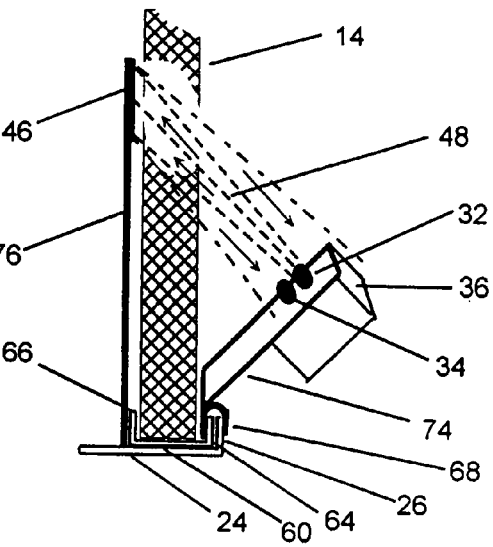
FIG. 5 is an end view of a bracket as in FIG. 4 "U" with detector components and filter shown.

In FIG. 5 the bracket 60 is shown in position with other components of the system. The bracket is secured to the ledge 26 of the filter receptacle by clips, 68 and the lower end of a first arm 74 is fixedly connected to side strip 64. Arm 74 extends outward at an angle away from the filter, and at its upper end is connected to housing 36, in which transmitter 32 and receiver 34 are carried. A second arm 76 is pivotally connected at its lower end to side strip 66 of the bracket 60 and at its upper end supports a retroreflector assembly (typically retroreflecting tape) 46 aligned for being contacted with light 48 from transmitter 32 and reflecting it back to receiver 34.

Figure 6:
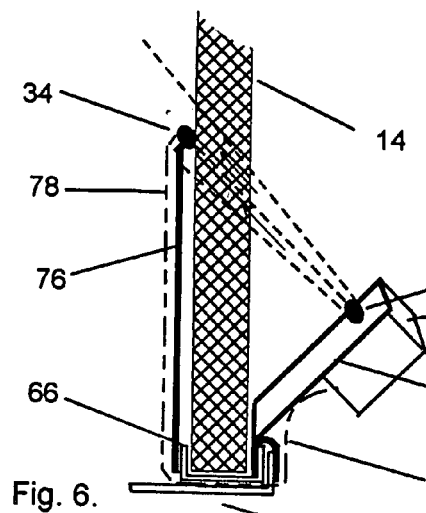
FIG. 6 is an end view of a bracket as in FIG. 1 showing a transmitter and a receiver placed on opposite sides of a filter.

FIG. 6 shows an embodiment wherein transmitter 32 and receiver 34 are placed on opposite sides of the filter and transmitted light passes through the filter only once. Upon contacting the optical receiver, light is converted to an electrical signal, which is carried to a processing assembly in housing 36 by means of wire 78. The wire may be placed between the bracket and receptacle plate as shown. No reflector is included in this embodiment.

Figure 7:
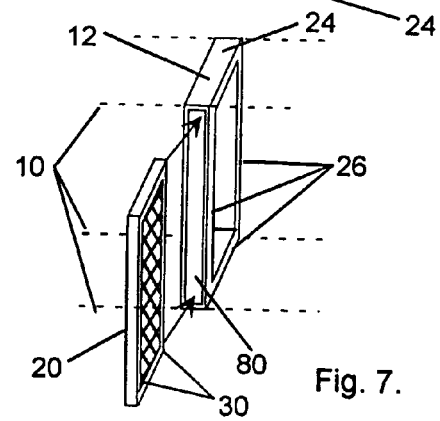
FIG. 7 is an exploded view of a filter receptacle arrangement in use in certain HVAC systems.
Figure 8:
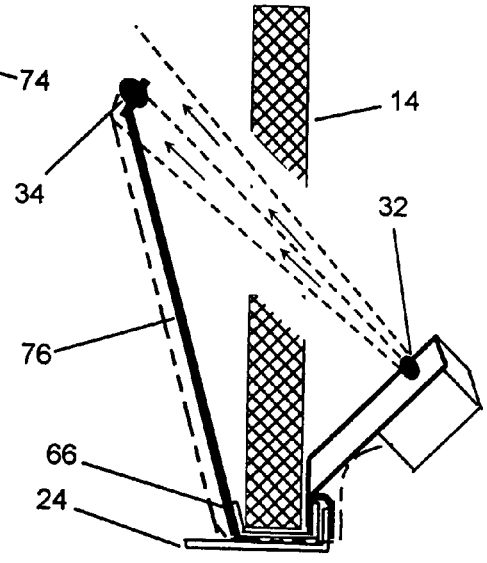
FIG. 8 is an end view showing placement of both the transmitter and the receiver spaced apart from the filter where more space is available.

FIG. 7 shows a filter receptacle 12 located at some distance away from an end of a duct or plenum 10. Access to this type receptacle is provided by a slot 80 replacing a side plate so that the filter may be inserted from the side instead of from a downstream end position. Both arms of the sensor may extend out angularly away from the filter as shown in FIG. 8 to take advantage of the space available on both sides and minimize shielding of the filter from air flow and entrained dust. The sensor shown in FIG. 8 has a transmitter 32 on one side of the filter and a receiver 34 on the other side, with a wire 78 extending underneath the filter as shown in FIG. 6.

Figures 9, 10:
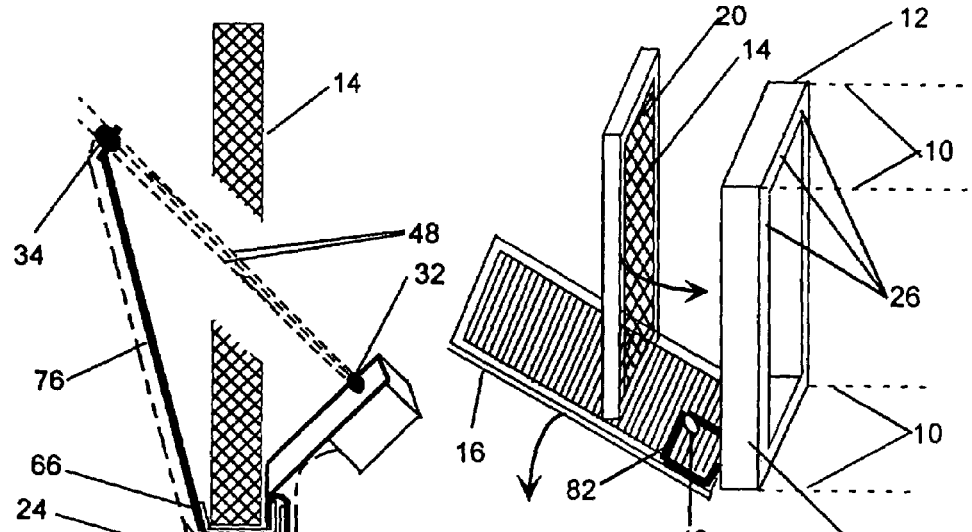
FIG. 9 is a view as in FIG. 8 wherein a laser is used as the light source.
FIG. 10 is an exploded partial view of a detector in which a reflector is supported adjacent to the filter on a frame attached to a grill structure.

The embodiment shown in FIG. 9 is similar to that of FIG. 8, except that the transmitter 32 in this instance is a laser, which produces a much narrower beam 48.

Figures 11, 12:
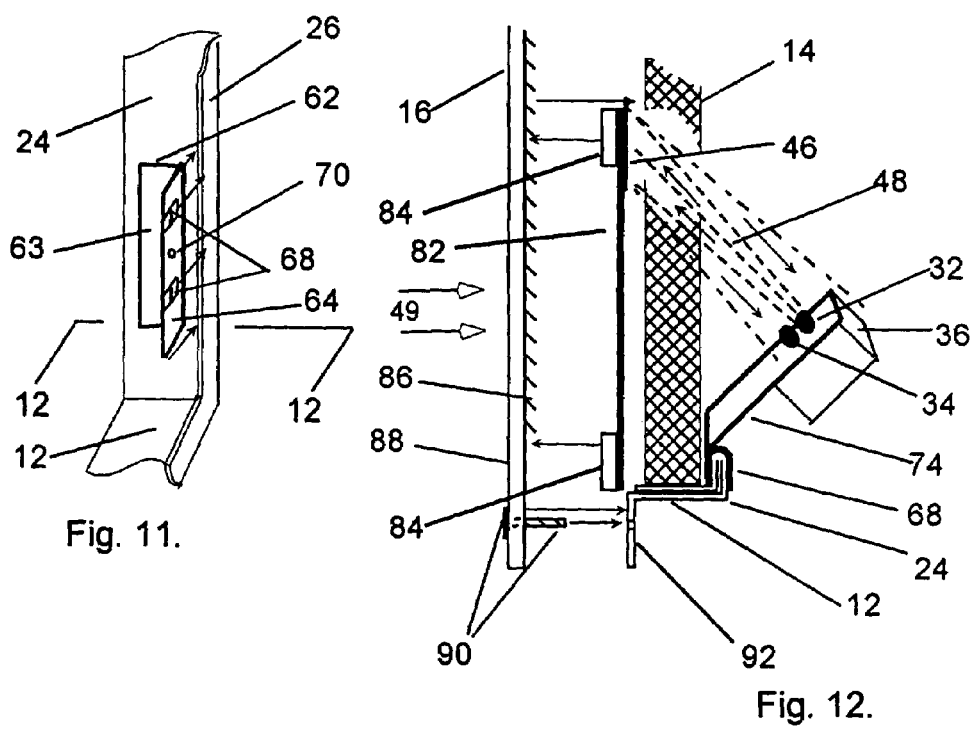
FIG. 11 is an exploded view of an "L" shaped bracket for use in combination with a component support as in FIG. 10.
FIG. 12 is an end view of a detector wherein a component support member is attached directly to a grill.

FIGS. 10, 11 and 12 show an embodiment wherein a retroreflector assembly 42 is carried on an upper corner of a rectangular metallic (or plastic) frame 82 which is attached by magnets 84 to the frame 88 of louvered 86 grill 16. The outer frame 88 of the grill 16 is shown in position to be attached by fastener 90 by engaging a flange 92 extending downward from the filter receptacle plate 24. Arm 74, which supports transmitter 32, receiver 34 and housing 36, is connected to the side strip 64 of L-shaped bracket 63 at aperture 70. The bracket in turn is secured to ledge 26 of the filter receptacle by clips 68. In this instance the magnetically supported frame which supports the reflector is not connected to the bracket as in other embodiments.

FIG. 13 depicts the retroreflector 42 attached to the filter support material 22 and not requiring a separate support structure. This attachment can be performed by either the filter manufacturer or in the field with adhesive. Attachment is typically upstream 49 of the sensor in a prealigned position, such that the sensor alignment operation is required only during initial sensor installation.

Operation of clogged filter detection of this invention is shown schematically in FIG. 14 for a filter in use. Elements of the processing assembly 35 are carried in housing 36 supported by one of the arms. An electrical signal is generated at microprocessor 94, controlled by driver 96, and converted to optical at transmitter 32. The resulting radiation beam 48 traverses a subject filter 14 body 20 and mesh 22 on either side thereof, impinges upon the retroreflector 42 and is reflected 52 back toward the optical receiver 34. At the optical receiver it is converted back to electrical form and fed into an analog amplifier 97 assembly. The amplified signal is digitized via analog-to-digital (A-to-D) converter 98, entered into the microprocessor 94 and stored in digital memory 100. This provides a relative measurement of the optical transmittance through the optical network including the filter body 20 and mesh 22.

Immediately after filter replacement (i.e., with the clean filter), a digital calibration signal from the A-to-D converter 98 output is stored in memory 100 upon command by manual activation of momentary external switch 102. This provides a mechanism for sensor operation with many different types of filters, each with its own specific optical properties when clean. The microprocessor is programmed to compare the stored digital calibration signal with a pre scheduled daily measurement of the optical transmittance through the filter mesh. An indication is broadcast optically 104, aurally 106 and/or otherwise locally and/or transmitted 108 to a remote location when the A-to-D output drops to a preprogrammed level. This preprogrammed level indicates that the filter 14 has clogged with dust, etc., and the optical transmittance through the filter has degraded to a preselected level which is a preprogrammed amount below the initial clean filter calibration level. For more complex HVAC systems, the digital value of the A-to-D output may be transmitted (108) on a scheduled basis to the remote location.

FIG. 15 depicts the detector manufactured simultaneously with the filter receptacle 12, thereby reducing the number of parts. First arm 74 is attached directly to ledge 26. Side strip 66 is attached directly to side plate 24 by means such as welding.

The transmitter, receiver and reflector can be mounted on either the upstream or downstream sides of the filter. More than one transmitter and/or receiver can be used to provide more versatility in eliminating obstructions due to the filter support structure. A corner structure may be added to the detector support bracket 62 for additional structural support. If the ledge 26 of the receptacle 12 is sufficiently strong to maintain alignment without any bottom strip 63, side plates 64 may be attached directly to ledge 26 without strip 63.

Figure 16:
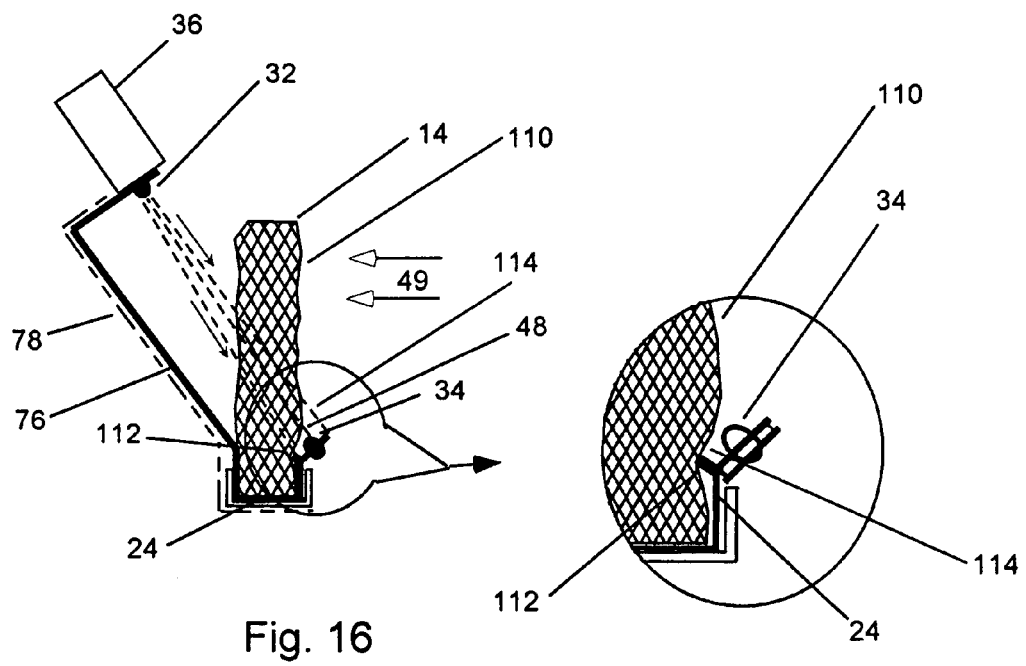
FIG. 16 is an end view of the detector in which the transmitter is cantilevered away from the filter, the receiver is adjacent the filter and a spring depresses filter material at the receiver.

The embodiment shown in FIG. 16 is similar to that of FIG. 6, except that the transmitter 32 is cantilevered away from the filter 14 and the receiver 34 is adjacent the filter. In cases with spun glass filters, the filter material is very fluffy and sometimes presents an uneven surface 110, which tends to enwrap the receiver 34 and reduce dust or lint accumulation within the transmitter/receiver pathway 48. In FIG. 16 a spring 112 attached to the sensor frame 24 depresses the fluffy material 114 and allows dust or lint to enter the space near the receiver 34.

Figure 17:
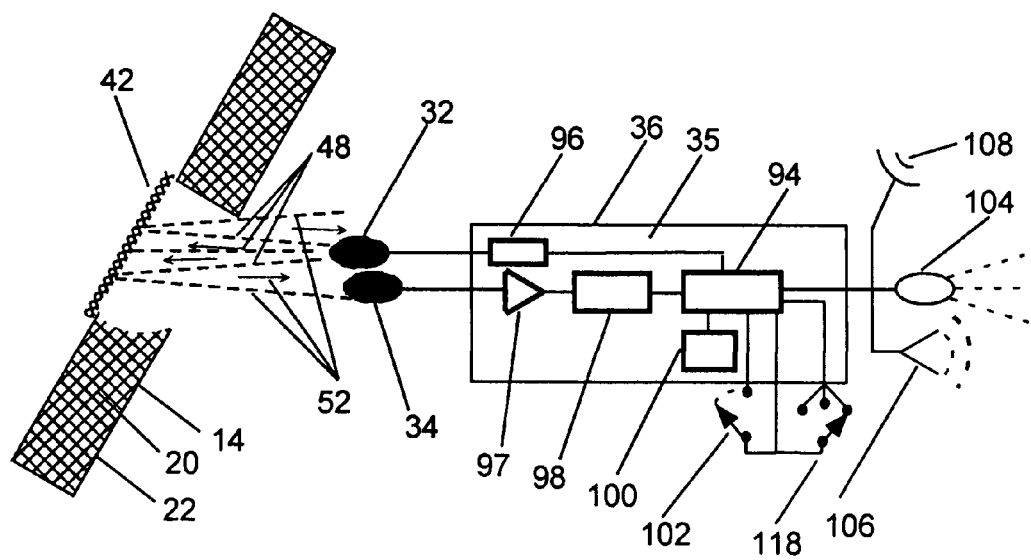
FIG. 17 is a schematic view showing operation of an electrical network for a transmitter/receiver assembly with an external sensitivity adjustment.

The embodiment shown in FIG. 17 is similar to that of FIG. 14, except that an external sensor sensitivity control 118 is added, enabling the user to adjust sensitivity for the type filter and environment encountered. Pleated filters tend to obscure more rapidly than non-pleated filters for similar reductions in airflow speed.

In an embodiment of the sensor, the microprocessor 94 of FIG. 17 is programmed to provide a visible indicator 104 that the filter needs changing for a period of time (typically several days) prior to activating the aural 106 signal.

While the invention is described above in terms of specific embodiments, it is not to be understood as so limited, but is limited only as indicated in the appended claims.

What is claimed is:

1. A clogged filter detector for determining a level of obscuration of a flat filter disposed in an air conditioning system, said filter having a body and a peripheral frame and said system comprising a filter receptacle carried in a duct or plenum thereof, said receptacle including a plurality of rigid plates having surfaces generally parallel to a direction of air flow and defining outer walls of a structure into which a said filter may be removably inserted and retaining ledges connected to said plates and disposed perpendicular thereto, said plates and said ledges being adapted to come into contact with a said frame upon insertion of a said filter, said detector comprising:

an optical transmitter positioned to transmit a beam of light through a said filter, a receiver including a sensor disposed to be contacted by said light beam after passing through said filter and further including means to provide an electrical signal representative of optical transmittance through said filter, said receiver and said filter aligned off-set from one another and said light beam non-parallel to air flow direction, and support means for holding said transmitter and said receiver in an aligned position with respect to a selected area of said filter, said support means including a bracket comprising at least a first strip connectable to a said receptacle plate and said first strip being disposed for placement between a said plate and an edge portion edge of said filter upon insertion of the filter, and a first arm connected to said first strip and extending to a position opposing a face of said filter.

2. The clogged filter detector as defined in claim 1 wherein said support means comprises means for holding said transmitter and said receiver in an aligned position with respect to a selected area of said filter, said support means including a bracket comprising a first strip conforming to a said receptacle plate and at least one side strip connected to a said ledge and said first strip being disposed between a said plate and a side edge of a said filter upon insertion of the filter, and a first arm connected to said side strip and extending to a position opposing a face of said filter.

3. The clogged filter detector as defined in claim 2 wherein said transmitter and said receiver are located in proximity to one another on one side of said filter and a reflector is located on an opposite side of the filter in position to receive light from transmitter after the light has passed through the filter and to reflect the light back through the filter to the receiver.

4. The clogged filter detector as defined in claim 3 wherein said filter is disposed across air duct at a selected angle, said reflector structure is generally parallel to said filter body and said transmitter and said receiver are aligned at an acute angle with respect to said filter.

5. The clogged filter detector as defined in claim 4 wherein said acute angle is 30 to 50 degrees.

6. The clogged filter detector as defined in claim 4 including a second arm connected to a side strip of said bracket, said first arm supporting said transmitter and said receiver and said second arm supporting said reflector.

7. The clogged filter detector as defined in claim 6 wherein said reflector is a retroreflector.

8. The clogged filter detector as defined in claim 7 wherein said second arm is pivotally mounted on said strip whereby said retroreflector may be adjustably placed in a selected position providing a clear path to said transmitter and said receiver.

9. The clogged filter detector as defined in claim 8 including a housing connected to said first arm and containing said transmitter and said receiver.

10. The clogged filter detector as defined in claim 2 including a second arm connected to a side strip of said bracket on a side of the filter opposite to said first arm and wherein said transmitter and said receiver are carried on separate arms on opposite sides of said filter.

11. The clogged filter detector as defined in claim 4 wherein said system includes a metal grill in close proximity to and facing said filter and said support means includes a structural component connected to said grill and carrying a reflector.

12. The clogged filter detector as defined in claim 11 wherein said structural component is magnetically connected to said grill.

13. The clogged filter detector as defined in claim 3 including means to compensate for adverse effects of reflection of light from a surface of said filter.

14. The clogged filter detector as defined in claim 13 wherein said compensating means comprises a pair of polarizing filters and a quarter wave retarder disposed between said transmitter and said reflector.

15. A clogged filter detector for determining a level of obscuration of a filter in an air circulation system and providing a perceptible indication when said level exceeds a predetermined level, said filter having a body and a peripheral frame and said system comprising a filter receptacle carried in a duct or plenum thereof, said receptacle including a plurality of rigid plates having surfaces generally parallel to a direction of air flow and defining outer walls of a structure into which a said filter may be removably inserted and retaining ledges connected to said plates and disposed perpendicular thereto, said plates and said ledges being adapted to come into contact with a said frame upon insertion of a said filter, said detector comprising:

an optical transmitter positioned to transmit a beam of light through a said filter, a receiver including a sensor disposed to be contacted by said light beam after passing through said filter, a processing assembly further comprising a microprocessor having a digital memory in which a predetermined level of obscuration has been entered, means for converting a detected optical signal to electrical form, digitizing the resulting electrical signal and comparing the detected signal level with said predetermined level and for providing perceptible indication when said detection signal level drops below said predetermined level, and support means for holding said transmitter and said receiver in an aligned position with respect to a selected area of said filter, said support means including a bracket comprising a first strip conforming to a said receptacle plate and at least one side strip connected to a said ledge and said first strip being disposed between a said plate and a side edge of a said filter upon insertion of the filter, and a first arm connected to said side strip and extending to a position opposing a face of said filter.

16. The clogged filter detector as defined in claim 15 including means for entering and storing an initial clean filter obscuration reference level.

17. The clogged filter detector as defined in claim 15 including means for transmitting an indication signal to a remote location.

18. The clogged filter detector as defined in claim 15 wherein said transmitter and said receiver are located in proximity to one another on one side of said filter and a retroreflector is located on an opposite side of the filter in position to receive light from transmitter after the light has passed through the filter and to reflect the light back through the filter to the receiver.

19. The clogged filter detector as defined in claim 15 including a second arm connected to a side strip of said bracket on a side of the filter opposite to said first arm and wherein said transmitter and said receiver are carried on separate arms on opposite sides of said filter.

20. A clogged filter detector for determining a level of obscuration of a filter disposed in an air conditioning system, said filter having a body and a peripheral frame and said system comprising a filter receptacle carried in a duct or plenum thereof, said receptacle including a plurality of rigid plates having surfaces generally parallel to a direction of air flow and defining outer walls of a structure into which a said filter may be removably inserted and retaining ledges connected to said plates and disposed perpendicular thereto, said plates and said ledges being adapted to come into contact with a said frame upon insertion of a said filter, said detector comprising:

an optical transmitter positioned to transmit a beam of light through a said filter, a receiver including a sensor disposed to be contacted by said light beam after passing through said filter and further including means to provide an electrical signal representative of optical transmittance through said filter, and support means for holding said transmitter and said receiver in an aligned position with respect to a selected area of said filter, said support means including a first arm attached to a said retaining ledge and at least one side strip connected to a said rigid plate and a second arm attached to said side strip and upon insertion of the filter, movable into aligned position with respect to said transmitter and said receiver.

21. The clogged filter as defined in claim 1 wherein a selected one of said transmitter and receiver components is located in a cantilevered position spaced apart from said filter, of non selected one of said components is located adjacent to said filter and including a resilient structural member disposed in contact with said filter to obtain a more even surface of the filter whereby fluffy material of the filter surface may be depressed, and dust and lint are enabled to freely enter space near the non selected component.

22. The clogged filter as defined in claim 15 including an external sensitivity control enabling adjustment of sensitivity for the type of filter and enviornment encountered.

23. The clogged filter detector as defined in claim 15 including an aural device providing a perceptible aural indicaion upon expiration of a predetermined delay.

* * * * *